United States Patent [19]

Arcella et al.

[11] Patent Number: 5,260,393
[45] Date of Patent: Nov. 9, 1993

[54] VINYLIDENE FLUORIDE BASED FLUOROELASTOMERIC COPOLYMERS MODIFIED WITH PERFLUOROALKYLVINYLETHER

[75] Inventors: Vincenzo Arcella, Novara; Giulio Brinati, Milan; Margherita Albano, Milan; Anna Minutillo, Milan; Graziella Chiodini, Saronno, all of Italy

[73] Assignee: Ausimont S.p.A., Milan, Italy

[21] Appl. No.: 15,266

[22] Filed: Feb. 8, 1993

Related U.S. Application Data

[63] Continuation of Ser. No. 744,778, Aug. 14, 1991, abandoned.

[30] Foreign Application Priority Data

Jul. 24, 1991 [IT] Italy .............. MI 91 A 002040

[51] Int. Cl.⁵ ............................................ C08F 16/24

[52] U.S. Cl. .................................. 526/247; 526/249; 526/254; 526/255

[58] Field of Search ............... 526/247, 249, 254, 255

[56] References Cited

U.S. PATENT DOCUMENTS 4,123,603 10/1978 Stewart, Jr. .................... 526/254
4,745,165 5/1988 Arcella et al. .................. 526/250

FOREIGN PATENT DOCUMENTS 407937 1/1991 European Pat. Off. ........... 526/247

Primary Examiner—Joseph L. Schofer
Assistant Examiner—N. Sarofim
Attorney, Agent, or Firm—Bryan Cave

[57] ABSTRACT

Fluoroelastic copolymers, suitable for the manufacture of O-rings, comprising by weight:
48-65% of VDF units
21-36% of HFP units
3-9% of PAVE units
0-17% of TFE units 4 Claims, No Drawings

VINYLIDENE FLUORIDE BASED FLUOROELASTOMERIC COPOLYMERS MODIFIED WITH PERFLUOROALKYLVINYLETHER

This is a continuation of U.S. application Ser. No. 07/744,778, filed Aug. 14, 1991, now abandoned which is incorporated by reference herein.

THE PRIOR ART

The present invention concerns novel fluoroelastomeric copolymers, suitable for the manufacture of O.rings, based on monomeric units being derived from vinylidene fluoride (VDF), exafluoropropene (HFP), and if desired tetrafluoroethylene (TFE), which are ionically vulcanizable, show good elastomeric characteristics at both high and low temperatures and give a good processability, in terms of releasability from the mold after vulcanization.

Known fluoroelastomeric copolymers consist of VDF and HFP, which are useful for preparing O.rings. Such copolymers show good properties at high temperatures, but poor properties at low temperatures.

U.S. Pat. No. 4,123,603 and Italian Patent Application No. 41,003 A/90 in the name of the Applicant, describe terpolymers consisting of units of VDF, HFP and TFE at concentrations within a very limited range, which are ionically vulcanizable, give a satisfactory combination of properties at low and high temperatures, and at the same time possess good processability, especially regarding releasability from molds after vulcanization, for which they are particularly suitable for the manufacture of O-rings.

Said terpolymers nevertheless have the disadvantage of a very specific and limited monomeric composition, that precludes their use in other applications.

In the above mentioned terpolymers the optimization of the monomeric compositions gives an improvement of TR 10 (ASTM D1329) not superior to about 3° C. with respect to the above described copolymers consisting of VDF and HFP units.

It is known that fluoroelastomers showing better low temperature characteristics are those based on VDF, PAVE and possibly TFE units, containing small amounts of bromine containing olefins, or bromo alkylvinylethers, vulcanizable by free radicals with peroxides and crosslinking agents.

Nevertheless products obtained by using this type of crosslinking show poor compression set characteristics unsuitable for the production of O-rings.

Ionic vulcanization, which has the general advantage of giving rise to easily processable products showing better compression set values with respect to those from the free radical system, cannot be used, for the above mentioned fluoroelastomers.

In fact it results in polymer degradation and worsening of some properties, among which is the compression set at high temperatures.

With regard to this, the publication by W. W. Schmiegel "Crosslinking of Elastomeric Vinylidene Fluoride Copolymers with Nucleophiles" in "Die Angewandte Makromolekulare Chemie", No. 76/77/1979 can be cited.

French Patent No. 2,259,849 discloses ionically vulcanizable fluoroelastomeric copolymers, consisting of VDF, HFP, TFE and PAVE units, the latter of which is between 17 and 30% by weight based on the total monomers.

Finally, French Patent No. 2,347,389 discloses analogous fluoroelastomeric copolymers in which the content of PAVE units is between 10 and 17% by weight.

The fluoroelastomers of these patents show better characteristics in terms of TR 10 and compression set at low temperatures. Nevertheless the value of their compression set at high temperatures is poor. From tests carried out by the Applicant, copolymers having the monomeric composition exemplified in the two French Patents, show at 200° C. a compression set of above 24%. Furthermore, during the vulcanization carried out by ionic methods, the copolymers tend to become porous or to display bubbles on the surface due to the formation of volatile decomposition products, such as $F_2CO$ and HF, and foul the vulcanization molds (fouling). For these reasons, the polymers described in said patents are not suitable for use in the manufacture of O-rings.

THE PRESENT INVENTION

Fluoroelastomeric copolymers have now unexpectedly been found and form the object of the present invention, which comprise VDF, HFP, PAVE units and possibly contain also TFE units, wherein the PAVE units are comprised in quantities between 3 and 9% by weight, preferably between 4 and 8% by weight, based on the total monomeric units, which can be vulcanized by ionic methods without the above mentioned drawbacks, do not show fouling problems, and possess surprising low temperature characteristics, in particular in terms of values of TR 10, while maintaining sufficiently low compression set values at high temperatures, less than 20%. In particular, said copolymers are able to satisfy commercial specifications such as "Military Specification (MIL-R-83248B)", which requires a maximum value of 20% for the compression set on O-rings at 200° C. for 70 hours.

The copolymers which are the object of the present invention are characterized by the following composition of monomeric units by weight:

| | |
|---|---|
| VDF | 48–65% |
| HFP | 18–36% |
| PAVE | 3–9% |
| TFE | 0–17% | the sum of HFP +PAVE being a minimum of 27%.

Said copolymers are particularly suitable for the production of O-rings. With respect to the terpolymers described in U.S. Pat. No. 4,123,603 and Italian Patent Application No. 41,003 A/90, cited above, the copolymers of the present invention exhibit, at substantially equivalent contents of other monomers, and in particular VDF, a surpisingly improved low temperature performance.

Furthermore the present products show the advantage of being able to be used for articles requiring chemical resistance toward polar fluids, such as for example methanol, when VDF is sufficiently low, e.g. less than 55% by weight, preferably about 50% by weight.

This combination of properties cannot be obtained simultaneously with the prior art copolymers.

Particularly preferred for their optimum combination of low and high temperatures characteristics, as well as processability, are the copolymers having the following composition by weight of monomeric units:

| VDF | 60.5-64% |
|---|---|
| HFP + PAVE | 30-33% |
| TFE | 0-8% |
| PAVE | 5-8% |

One further embodiment of the present invention consists in the use, for the manufacture of O-rings, of copolymers characterized by the following composition of monomeric units by weight:

| VDF | 48-64% | |
|---|---|---|
| HFP | 18-36% | |
| PAVE | 3-12%, | preferably 3-9% |
| TFE | 0-17% | | the minimum value of HFP+PAVE being as indicated above.

The fluoroelastomeric copolymers of the present invention can be prepared by copolymerization of monomers by known methods, such as, for instance, those described in Kirk Othmer, Encyclopaedia of Chemical Technology, vol. 8, pages 500 and ff., 1979. In particular, polymerization in bulk, in organic solvent solution and in emulsion or suspension in water can be used as the polymerization methods.

Radical polymerization initiators which can be used are for example organic peroxides, such as ammonium or potassium persulphates, redox systems such as persulphate/bisulphite and iron persulphate, organic peroxides such as benzoyl peroxide, dicumylperoxide, diisopropylperoxydicarbonate, diethylhexyl. peroxydicarbonate, etc..

Preferably the preparation is carried out in an aqueous emulsion. Any type of emulsifier, fluorinated or partially fluorinated, or mixtures thereof with hydrogenated emulsifiers, can be used in the process of the invention; an example of emulsifier is given by fluorinated carboxylic acids.

Chain transfer agents which can be used are for example ethyl acetate, diethyl malonate; chain transfer agents containing iodine and/or bromine can also be use, such as for instance compounds having the general formula $Rf(I)_x(Br)_y$ ($Rf$=a perfluorinated hydrocarbon radical containing from 1 to 8 carbon atoms, x, y=integers comprised between 0 and 2, with at least x or y=1 and $x+y \leq 2$).

Furthermore alkaline or alkaline earth metal iodides and/or bromides can be used as chain transfer agents, as described in European Patent Application No. 407,937.

Polymerization temperatures are comprised between 25° C. and 150° C. and operating pressures between 8 and 80 atmospheres.

The perfluoroalkylvinylethers (PAVE) to be used in the preparation of the copolymers of this invention are those containing alkyl groups having 1-3 carbon atoms, such as perfluoromethylvinylether (PMVE), perfluoroethylvinylether (PEVE), and perfluoropropylvinylether (PPVE).

PMVE is preferred.

The preparation of the copolymers in accordance with the present invention can be advantageously carried out by polymerization in an aqueous suspension in the presence of a microemulsion formed by one or more perfluorooxyalkylenes and water, as described in European Patent Application Nos. 247,379 and 250,767.

Vulcanization systems usable for the polymers of the invention are well known and consist of a crosslinking agent and a vulcanization accelerator.

Usable crosslinking agents are for example those described in U.S. Pat. Nos. 4,259,463, 3,876,654, 4,233,421 and may include aromatic and aliphatic polyhydroxylic compounds.

Representative examples of the aromatic class are di-, tri- and tetrahydroxybenzene, -naphthalene, -anthracene and bisphenol derivatives. Preferred are aromatic compounds which include 4,4-thiodiphenol isopropylene-bis(4-hidroxybenzene) (i.e. Bisphenol A) and hexafluoroisopropylene-bis (4-hydroxybenzene) (i.e. Bisphenol AF), which are described in U.S. Pat. No. 4,233,421.

Compounds which can be used as vulcanization accelerators are known and are described, for example, in U.S. Pat. Nos. 3,655,727, 3,712,877, 3,857,807, 3,686,143, 3,933,732, 3,876,654, 4,233,421, 4,259,463, and in European Patent Application Nos. 0,182,299 and 0,120,462. Preferred are the compounds from the class of phosphonium and aminophosphonium quaternary salts described in U.S. Pat. Nos. 3,876,654 and 4,259,463.

In addition to O-rings, the copolymers of the present invention can also be used for preparing articles exhibiting a good compression set at high temperatures.

The following examples serve to illustrate the object of the present invention without having a limitative value.

The values of releasability of the plaques from the aluminum foil after treatment in press at 170° C. for 10 minutes are indicated with A when the release is good, and with B when it is mediocre.

EXAMPLE 1

A 5 l reactor equipped with a stirrer operating at 630

3,500 g of water are charged into the reactor under vacuum and the reactor is then brought to pressure using a monomeric mixture having the following molar composition:

| VDF | 48% |
|---|---|
| HFP | 39% |
| PMVE (perfluoromethylvinylether) | 13% |

The operating temperature is 85° C. and the pressure 19 relative bar.

Thereafter are added, in sequence:

4.2 g ammonium persulphate (PSA), dissolved in water.

6.4 g ethyl acetate as chain transfer agent, 3.2 g of which at 5% monomer conversion and the remainder subdivided into 4 additions of 0.8 g each, executed at 24%, 43%, 62% and 81% conversion, respectively.

The pressure is maintained constant during the polymerization, by feeding the monomers at the following molar ratios:

| VDF | 78.5% |
|---|---|
| HFP | 17.5% |
| PMVE | 4.0% |

After 66 minutes, 1,413 g of the polymer are obtained. The reactor is cooled, the emulsion discharged and coagulated by adding an aqueous solution of aluminum sulphate.

The polymer is isolated, washed in water and dried in an air circulating oven at 60° C. for 24 hours.

Table reports the data relative to the polymer composition, the value of the glass transition temperature $T_g$, and of the Mooney viscosity.

Table 2 reports data concerning the formulation used for the polymer vulcanization, the characteristics of such formulation, as well as the characteristics of the vulcanized polymer, after post-vulcanization in the oven at 230° C. for 24 hours. The vulcanization of the polymer has been carried out in press at 170° C. for 10 minutes.

EXAMPLE 2

A reactor as in Example 1 is used.

The reactor is brought to pressure using a monomeric mixture having the following molar composition:

| VDF | 47% |
|---|---|
| HFP | 45% |
| PMVE | 7% |

The operating temperature is 85° C. and the pressure 19 relative bar.

Feeding of PSA and ethyl acetate are carried out as in Example 1.

Pressure is maintained constant during polymerization by feeding a monomeric mixture of the following molar composition:

| VDF | 78.5% |
|---|---|
| HFP | 19.5% |
| PMVE | 2.0% |

After 65 minutes of polymerization, 1,450 g of the polymer are obtained.

Tables 1 and 2 report the data concerning the characteristics of the polymer obtained, the vulcanizing formulation and the vulcanized product.

EXAMPLE 3 (COMPARATIVE)

Operating conditions are as in Example 1, with the exception that the reactor pressure is attained using a monomeric mixture having the following molar composition:

| VDF | 53.5% |
|---|---|
| HFP | 46.5% |

The pressure is maintained constant during polymerization by feeding a monomer mixture having the following molar composition:

| VDF | 78.5% |
|---|---|
| HFP | 21.5% |

After 70 minutes of polymerization 1,560 g of polymer have been obtained.

Tables 1 and 2 report the data concerning the characteristics of the obtained polymer, the vulcanizing formulation and the vulcanized product.

EXAMPLE 4

A 10 l reactor equipped with a stirrer operating at 545 r.p.m. was used.

6,500 g of water are charged into the reactor under vacuum and the reactor is then brought to pressure using a monomeric mixture having the following molar composition:

| VDF | 61.0% |
|---|---|
| HFP | 28.0% |
| PMVE | 9.0 |
| TFE | 2.0 |

The operating temperature is 85° C. and the pressure 19 relative bar.

Thereafter are added, in sequence:

7.8 g of PSA dissolved in water.

14.8 g of ethyl acetate, 7.4 g of which at 5% monomer conversion and the remainder subdivided into 4 additions of 1.85 g each, executed at 24%, 43%, 62% and 81% conversion, respectively.

The pressure is maintained constant during the polymerization, by feeding the monomers at the following molar ratios:

| VDF | 81.0% |
|---|---|
| HFP | 12.0% |
| PMVE | 4.0% |
| TFE | 3.0%. |

After 52 minutes reaction time, 2,750 g of the polymer are obtained.

Tables 3 and 4 report the characteristics of said polymer, of the vulcanizing formulation and of the vulcanized product.

EXAMPLE 5 (COMPARATIVE)

Operating conditions are as in Example 4, with the exception that the reactor is brought to pressure using a monomer mixture having the following molar composition:

| VDF | 59% |
|---|---|
| HFP | 36% |
| TFE | 5% |

Pressure is maintained constant during polymerization by feeding a monomeric mixture of the following molar composition:

| VDF | 77.2% |
|---|---|
| HFP | 16.5% |
| TFE | 6.3% |

After 62 minutes of reaction 2,800 g of the polymer are obtained.

Tables 3 and 4 report the characteristics of the polymer, the vulcanizing formulation and the vulcanized product.

EXAMPLE 6

Operating conditions are as in Example 1, with the exception that in this case the pressure in the reactor is attained using a monomer mixture having the following molar composition:

| | |
|---|---|
| VDF | 57% |
| HFP | 30% |
| PMVE | 10% |
| TFE | 4% |

Pressure is maintained constant during polymerization by feeding a monomeric mixture of the following molar composition:

| | |
|---|---|
| VDF | 78.5% |
| HFP | 14.0% |
| PMVE | 3.5% |
| TFE | 4.0 |

Tables 5 and 6 report data concerning the characteristics of the obtained polymer, the vulcanizing formulation and the vulcanized product.

EXAMPLE 7 (COMPARATIVE)

Operating conditions are as in Example 1, with the exception that in this case the pressure in the reactor is attained using a monomer mixture having the following molar composition:

| | |
|---|---|
| VDF | 38% |
| HFP | 53% |
| TFE | 9% |

Pressure is maintained constant during polymerization by feeding a monomeric mixture of the following molar composition:

| | |
|---|---|
| VDF | 70.0% |
| HFP | 19.0% |
| TFE | 11.0 |

After 65 minutes of polymerization, 1,550 g of the polymer are obtained.

Tables 5 and 6 report data concerning the characteristics of the obtained polymer obtained, the vulcanizing formulation and the vulcanized product.

TABLE 1

| | | Example | | |
|---|---|---|---|---|
| | | 1 | 2 | 3 |
| Polymer Composition (% weight) | | | | |
| VDF | | 58.3 | 58.6 | 60.7 |
| HFP | | 32.8 | 36.9 | 39.3 |
| PMVE | | 8.9 | 4.5 | 0.0 |
| TFE | | 0 | 0 | 0 |
| Mooney Viscosity | (ML (1 + 10) 121° C. | 52 | 58 | 50 |
| $T_g$ (DSC) | (°C.) | −27 | −26 | −23 |

TABLE 2

| | | Example | | |
|---|---|---|---|---|
| | | 1 | 2 | 3 |
| Composition of Vulcanizing Formulation: | | | | |
| Polymer | | 100 | 100 | 100 |
| M1 | | 4 | 4 | 4 |
| M2 | | 1.5 | 1.5 | 1.5 |
| MgO DE | | 3 | 3 | 3 |
| Ca(OH)₂ | | 6 | 6 | 6 |
| MT Black | | 30 | 30 | 30 |
| Formulation Characteristics: | | | | |
| ODR 177° C. ARC ±3 (ASTM D 2084-81) | | | | |
| ML | (pounds × inch) | 16 | 16 | 16 |
| MH | (pounds × inch) | 116 | 118 | 121 |
| $T_{s2}$ | (s) | 147 | 135 | 132 |
| $T'_{90}$ | (s) | 243 | 234 | 228 |
| Crosslinking Yield | (MH-ML) | 100 | 102 | 108 |
| Characteristics of the Product (Vulcanized in Press at 170° C. for 10 min and Post-Vulcanized at 230° C. for 24 hrs) (ASTM D412-83) | | | | |
| M 100 | (MPa) | 6.6 | 6.7 | 7 |
| C.R. | (MPa) | 14.7 | 15.1 | 15.9 |
| A.R. | (%) | 176 | 174 | 178 |
| Shore A (ASTM D 2240-81) | | 73 | 74 | 73 |
| TR Test (ASTM D1329) | | | | |
| TR 10% | (°C.) | −20 | −19 | −17 |
| TR 30% | (°C.) | −16 | −15.0 | −13 |
| TR 50% | (°C.) | −13 | −12.4 | −10.9 |
| Compression Set (200° C. for 70 hrs) (ASTM D1414-78) | | | | |
| O-RING | | | | |
| 23° C. for 70 hrs (ASTM D395/B) | (%) | 18 | 15 | 14 |
| 0° C. for 70 hrs (ASTM D395/B) | (%) | 11 | 11 | 11 |
| DISC (12.5 × 29 mm): | | | | |
| Reading after 30 min at 23° C. | (%) | 5.8 | 4.5 | 3.9 |
| Reading after 24 hrs at 23° C. | (%) | 2.8 | 2.2 | 2 |
| Plaque Release from Aluminum Foil | | | | |
| (after treatment in press at 170° C. for 10 min) | | A | A | A |

M1: Master 50% elastomer/50% Bisphenol AF
M2: Master 70% elastomer/30% Diphenylbenzyl, N-diethylphosphonium chloride

TABLE 3

| | | Example | |
|---|---|---|---|
| | | 4 | 5 |
| Polymer Composition (% weight) | | | |
| VDF | | 61.0 | 61.4 |
| HFP | | 23.0 | 30.8 |
| PMVE | | 8.0 | 0.0 |
| TFE | | 8.0 | 7.8 |
| Mooney Viscosity | (ML (1 + 10) 121° C.) | 38 | 36 |
| $T_g$ (DSC) | (°C.) | −34.4 | −29.0 |

TABLE 4

| | | Example | |
|---|---|---|---|
| | | 4 | 5 |
| Composition of Vulcanizing Formulation: | | | |
| Polymer | | 100 | 100 |
| M1 | | 4 | 4 |
| M2 | | 1.5 | 1.5 |
| MgO DE | | 3 | 3 |
| Ca(OH)₂ | | 6 | 6 |
| MT Black | | 30 | 30 |
| Formulation Characteristics: | | | |
| ODR 177° C. ARC ±3 (ASTM D 2084-81) | | | |
| ML | (pounds × inch) | 12 | 13 |
| MH | (pounds × inch) | 98 | 100 |
| $T_{s2}$ | (s) | 129 | 117 |
| $T'_{90}$ | (s) | 193 | 186 |
| Crosslinking Yield | (MH-ML) | 86 | 87 |
| Characteristics of the Product (Vulcanized in Press at 170° C. for 10 min and Post-Vulcanized at 230° C. for 24 hrs) | | | |

TABLE 4-continued

|  |  | Example 4 | Example 5 |
|---|---|---|---|
| (ASTM D412-83) | | | |
| M 100 | (MPa) | 5.2 | 5.7 |
| C.R. | (MPa) | 15.0 | 15.4 |
| A.R. | (%) | 196 | 186 |
| Shore A (ASTM D2240-81) | | 70 | 70 |
| Test TR (ASTM D1329) | | | |
| TR 10% | (°C.) | −25 | −19 |
| TR 30% | (°C.) | −21 | −15 |
| TR 50% | (°C.) | −18 | −12 |
| Compression Set 200° C. for 70 hrs (ASTM D1414-78) | | | |
| O-RING | | | |
| 23° C. for 70 hrs (ASTM D395/B) | (%) | 18 | 15 |
| 0° C. for 70 hrs (ASTM D395/B) | (%) | 20 | 18 |
| Disc (12.5 × 29 mm): | | | |
| Reading after 30 min at 23° C. | (%) | 18 | 17 |
| Reading after 24 hrs at 23° C. | (%) | 11 | 9 |
| Plaque Release from Aluminum Foil | | | |
| (after treatment in press at 170° C. for 10 min) | | A | A |

M1: Master 50% elastomer/50% Bisphenol AF
M2: Master 70% elastomer/30% Diphenylbenzyl. N-diethylphosphonium chloride

TABLE 5

|  |  | Example 6 | Example 7 |
|---|---|---|---|
| Polymer Composition (% weight) | | | |
| VDF | | 53.5 | 51.3 |
| HFP | | 26.7 | 36.1 |
| PMVE | | 8.0 | 0.0 |
| TFE | | 11.8 | 12.6 |
| Mooney Viscosity | (ML (1 + 10) 121° C.) | 55 | 62 |
| $T_g$ (DSC) | (°C.) | −31.7 | −21.6 |

TABLE 6

|  |  | Example 6 | Example 7 |
|---|---|---|---|
| Composition of Vulcanizing Formulation: | | | |
| Polymer | | 100 | 100 |
| M1 | | 4 | 4 |
| M2 | | 1.5 | 1.5 |
| MgO DE | | 3 | 3 |
| Ca(OH)$_2$ | | 6 | 6 |
| MT Black | | 30 | 30 |
| Formulation Characteristics: | | | |
| ODR 177° C. ARC ±3 (ASTM D 2084-81) | | | |
| ML | (pounds × inch) | 14 | 15 |
| MH | (pounds × inch) | 111 | 99 |
| $T_{g2}$ | (s) | 135 | 162 |
| $T'_{90}$ | (s) | 255 | 300 |
| Crosslinking Yield | (MH-ML) | 97 | 84 |
| Characteristics of the Product (Vulcanized in Press at 170° C. for 10 min) and Post-Vulcanized at 230° C. for 24 hrs) (ASTM D412-83) | | | |
| M 100 | (MPa) | 5.7 | 5.2 |
| C.R. | (MPa) | 14.9 | 15.2 |
| A.R. | (%) | 209 | 234 |
| Shore A (ASTM D2240-81) | | 72 | 73 |
| Test TR (ASTM D1329) | | | |
| TR 10% | (°C.) | −22 | −15.8 |
| TR 30% | (°C.) | −18 | −12 |
| TR 50% | (°C.) | −15.5 | −9.8 |
| Compression Set (200° C. for 70 hrs) ASTM D1414-78) | | | |
| O-RING | | | |
| 23° C. for 70 hrs (ASTM D395/B) | (%) | 19 | 19 |
| 0° C. for 70 hrs (ASTM D395/B) | (%) | 14 | 12 |
| Disc (12.5 × 29 mm): | | | |
| Reading after 30 min at 23° C. | (%) | 11 | 10 |
| Reading after 24 hrs at 23° C. | (%) | 5 | 3 |
| Plaque Release from Aluminum Foil | | | |
| (after treatment in press at 170° C. for 10 min) | | A | A |

M1: Master 50% elastomer/50% Bisphenol AF
M2: Master 70% elastomer/30% Diphenylbenzyl. N-diethylphosphonium chloride

We claim:

1. An ionically vulcanizable fluoroelastomeric copolymer exhibiting improved compression set characteristics suitable for the production of O-rings, consisting essentially of the following non-brominated monomeric units:
   (a) 48-65% by weight of vinylidene fluoride (VDF);
   (b) 21-36% by weight of hexafluoropropene (HFP);
   (c) 3-9% by weight of perfluoroalkylvinylether (PAVE); and
   (d) 0-17% by weight of tetrafluoroethylene (TFE);
   wherein the sum of the HFP and PAVE contents is at least 27 weight %.

2. The fluoroelastomeric copolymer of claim 1, wherein the percentage by weight of component (c) is 4-8%.

3. The fluoroelastomeric copolymer of claim 1, wherein the percentages by weight of components (a), (c) and (d) are:
   (a) 60.5-64%,
   (c) 5-8%; and
   (d) 0-8%;
   and the sum of the HFP and PAVE contents is 30-33% by weight.

4. The ionically vulcanizable fluoroelastomeric copolymer of claim 1, wherein component (c) is selected from the group consisting of perfluoromethylvinylether, perfluorethylvinylether and perfluoropropylvinylether.

* * * * *